Sept. 2, 1941.      L. F. POOCK ET AL      2,254,312
MACHINE TOOL
Original Filed Dec. 29, 1937      6 Sheets-Sheet 1

INVENTORS
Louis F. Poock
BY Willis Fay Allen
Maréchal & Noe
ATTORNEY

Sept. 2, 1941.　　　L. F. POOCK ET AL　　　2,254,312
MACHINE TOOL
Original Filed Dec. 29, 1937　　　6 Sheets-Sheet 4

Sept. 2, 1941.　　　L. F. POOCK ET AL　　　2,254,312
MACHINE TOOL
Original Filed Dec. 29, 1937　　6 Sheets-Sheet 5

INVENTORS
Louis F. Poock
BY Willis Fay Aller
Maréchal + Nor
ATTORNEY

Sept. 2, 1941.  L. F. POOCK ET AL  2,254,312

MACHINE TOOL

Original Filed Dec. 29, 1937   6 Sheets-Sheet 6

INVENTORS
Louis F. Poock
BY Willis Fay Aller
Maréchal & Nor
ATTORNEY

Patented Sept. 2, 1941

2,254,312

UNITED STATES PATENT OFFICE 2,254,312

MACHINE TOOL

Louis F. Poock and Willis Fay Aller, Dayton, Ohio, assignors, by mesne assignments, to The Sheffield Corporation, a corporation of Ohio Application December 29, 1937, Serial No. 182,204
Renewed October 27, 1939

18 Claims. (Cl. 90—1.4)

This invention relates to machine tools for operating on gears and the like.

One object of the invention is the provision of a machine adapted to shape or chamfer the ends of gear teeth by means of a rotatable cutter, the machine having provision for holding and moving the gear being worked on in an axial direction and in a rotational manner in timed relation to its axial movements, the means controlling the movements of the gear being so arranged as to substantially eliminate lost motion and to exactly time the axial movements with respect to the rotational movements of the gear.

Another object of the invention is the provision of a machine of the character mentioned having a plurality of devices one of which controls the axial movements of the gear operated on while the other controls its rotational movements, these devices being mounted on a common supporting shaft arranged adjacent the work carrying member.

Another object of the invention is the provision of a machine of the character mentioned in which the work carrying member is supported for axial movement in a supporting base, and the mechanism controlling its axial movements is arranged in vertically spaced relation with respect thereto.

Another object of the invention is the provision of a machine of the character mentioned in which the means controlling the axial movements of the work carrying member is supported adjacent the means controlling the rotational movements of the work carrying member, these two means being readily removable so that they may be conveniently replaced to adapt the machine for the particular tooth arrangement of the gear operated on.

Another object of the invention is the provision of a machine for chamfering operations or the like that may be readily changed merely by the substitution of a few parts from one adapted to cut the gear teeth by an external or pencil cutter to one in which a hollow mill cutter is used.

Another object of the invention is the provision of a machine for shaping or chamfering the ends of gear teeth including a work supporting base which is adapted for rotational and for sliding movements on the main frame of the machine so that the work carried thereby may be properly positioned with respect to a rotatable cutter on a cutter head which is slidable in the direction of the cutter axis and which is vertically adjustable on the main supporting frame by threaded members.

Another object of the invention is the provision, in a machine of the character mentioned, of an oil pump which is operated each time an indexing or work advancing movement takes place for the supply of oil to the moving parts of the mechanism.

Other objects and advantages of the invention will be apparent from the following description, the appended claims, and the accompanying drawings in which—

The machine as herein shown is one that is adapted to shape, round, burr, or chamfer the lateral ends or edges of the teeth of gears, and the like, so that the gears may be more readily placed in mesh or so that the burrs on the edges of teeth may be removed.

Figure 1:
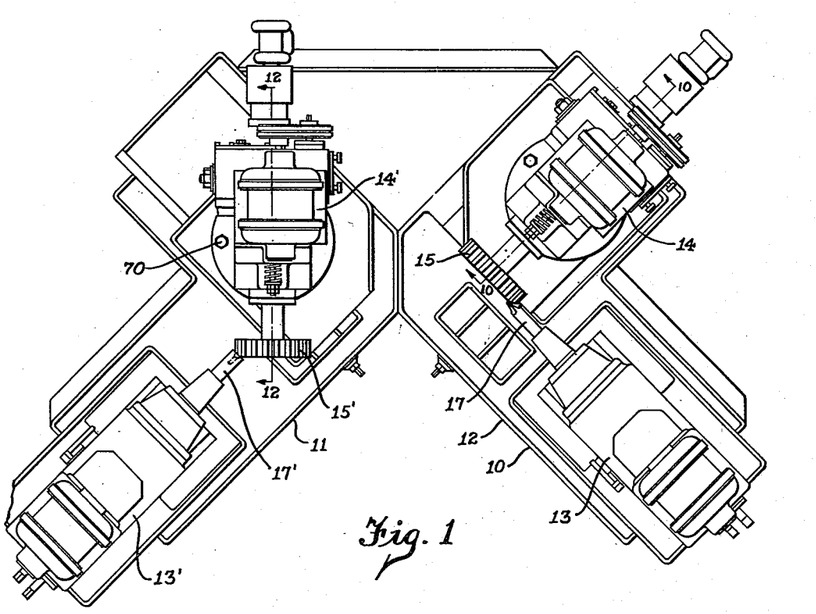
Fig. 1 is a top plan view of a machine tool embodying the present invention.

Referring more particularly to the drawings by reference numerals, the machine as shown in Fig. 1 comprises a main supporting frame 10 including frame sections 11 and 12 each of which supports a cutter head and a work carrying base, the cutter heads being indicated at 13 and 13' and the work carrying bases at 14 and 14'. Each work carrying base is adapted to support a work piece, one of which is shown at 15, and the member on which the work is carried is so controlled as to move the work piece axially and also rotationally so that the ends of the gear teeth will be chamfered or cut by a rotatable milling cutter such as the pencil type cutter 17 carried by the cutter head 13. The two cutter heads are of the same construction and the two work supporting bases 14 and 14' are similar, but on the frame portion 11 the parts are shown adapted for use with a hollow mill cutter 17' engageable with the work piece or gear 15' so as to simultaneously mill a plurality of edges on the teeth of that gear. With the arrangement of the frame sections 11 and 12 the work on the two machines is conveniently arranged so that a single operator can readily watch the operations of both machines at the same time although each machine is preferably independent in its control.

The cutter head 13 comprises a cutter supporting spindle 20 on which the pencil cutter 17 is detachably mounted, this spindle being rotatably supported in a housing 21 and rotated at a suitable speed by means of an electric motor 22, preferably mounted on top of the housing. The housing is mounted for vertical adjustment within vertically extending wall portions 23 of a slide 24 which is mounted for rectilinear movement in the direction of the cutter axis on a slide 25. The latter is also mounted for rectilinear sliding movement on guideways 28 provided in the frame portion 12.

The vertical adjustment of the housing 21 is effected by rotating a shaft 26 having a square end adapted for reception in the socket in a hand crank or the like. This shaft is rotatably supported on the end wall 23 and on an intermediate partition wall 27 of slide 24 and carries a worm 28, engageable with a worm wheel 29 which is fixed to sprocket wheel 31 that is internally threaded and which acts as a nut. The latter is rotatably mounted at its lower end on a hollow pedestal or boss 36 provided in the lower wall of the slide 24. Near the opposite end of the slide 24 are additional sprocket wheel nuts 33 and 34 which are rotated equally and similarly with sprocket wheel 31 by sprocket chain 36'. The sprocket wheel nuts are in threaded engagement with threaded posts or studs 30 which are fixed to and extend downwardly from the bottom of the housing 21. The three sprocket wheels together with the chain 36 are removable from the slide 24 with the housing 21. As the worm 28 is rotated it turns sprocket wheel 31 which turns wheels 33 and 34 so as to raise or lower the housing while maintaining the cutter axis horizontal.

When the proper position of the housing has been determined, it is securely clamped to the side walls 23 by means of nuts 40 threaded on studs 41 which are fixed to the housing and which project through vertical slots 42 provided in the side walls 23 of the slide 24. Of course these nuts 40 are loosened before the housing is adjusted upwardly or downwardly on the slide.

The slide 24 may be moved in the direction of the cutter axis to exactly position the cutter with respect to the work by means of an adjusting shaft 45 which is rotatably supported in an extension 46 projecting downwardly from the center of the slide 24. The shaft 45 is threaded in a projection 47 which is rigid with the slide 25. When the proper position of the slide 24 on slide 25 is determined by rotating the shaft 45, the slide 24 may be securely held in place by a clamping action effected by turning a hand wheel 48 fixed to a shaft 49 having an eccentric or camming portion 50 which operates upwardly against a cross bar 51 so as to raise this cross bar. The ends of the cross bar are connected to studs 52 which have clamping heads 53 slidable in a groove provided in the slide 25. The outwardly projecting portions of the stud heads, when pulled upwardly by the action of the cam 50, engage with overlying portions of the slide 25 so that the two slide members will be securely clamped together.

Figures 7, 8, 9:
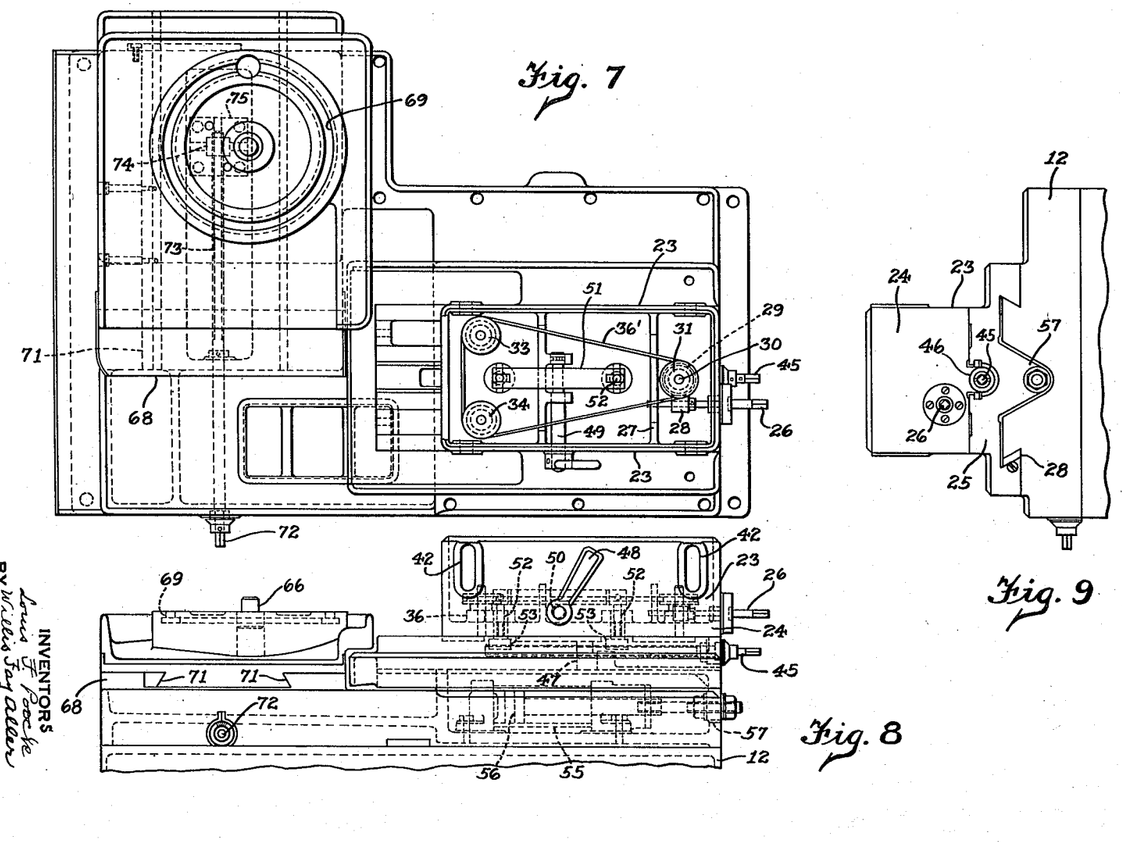
Fig. 7 is a top plan view showing the arrangement of the main supporting frame and the work and cutter head supporting slides.
Fig. 8 is a front elevation of the same.
Fig. 9 is an end elevation of the same.

The slide 25 is moved towards and away from the work position by a hydraulic cylinder 55. When fluid pressure is supplied to the left hand end of cylinder 55 the slide 25 is moved to the right as viewed in Fig. 8 until the end of the piston 56 comes up against the right hand cylinder head, the threaded outer end of the piston rod being secured to the downward extension 57 by positioning nuts, and the cylinder 55 being fixed in position below the slide 25. The advanced position of the cutting tool when the slide 24 is properly positioned in fixed position on slide 25 is determined by the end of the piston and the end of the cylinder. The tool may be advanced to the work by supplying fluid pressure to the right hand end of cylinder 55 and releasing the pressure at the opposite end.

Figure 2:
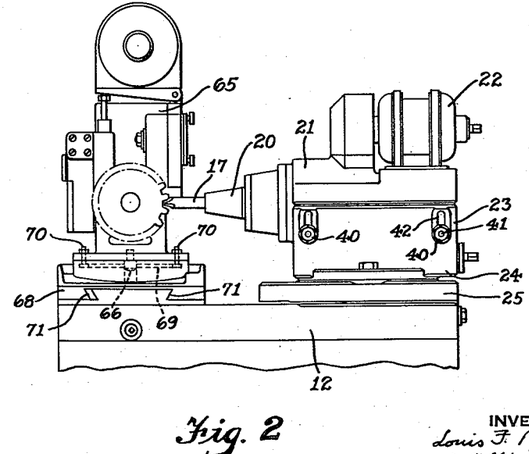
Fig. 2 is a side elevation of the right half of the machine.
Figure 3:
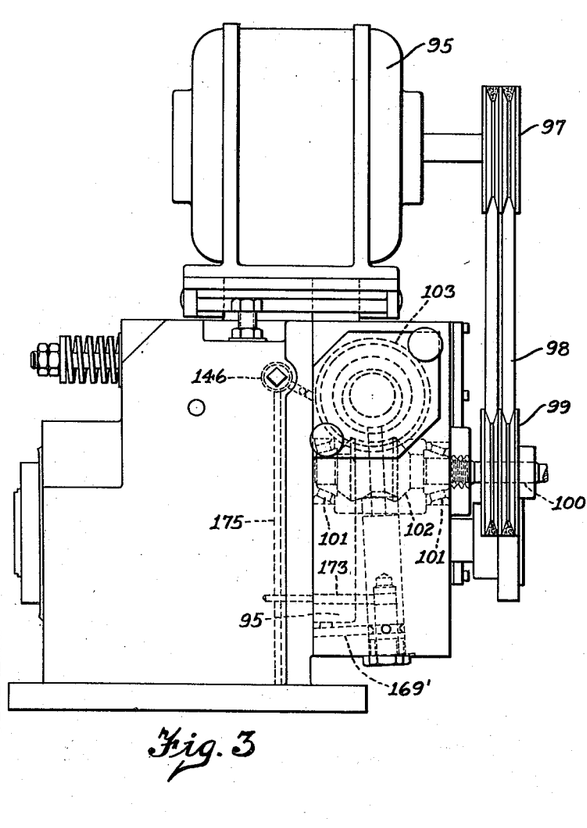
Fig. 3 is a side elevation of the work carrying base.
Figure 4:
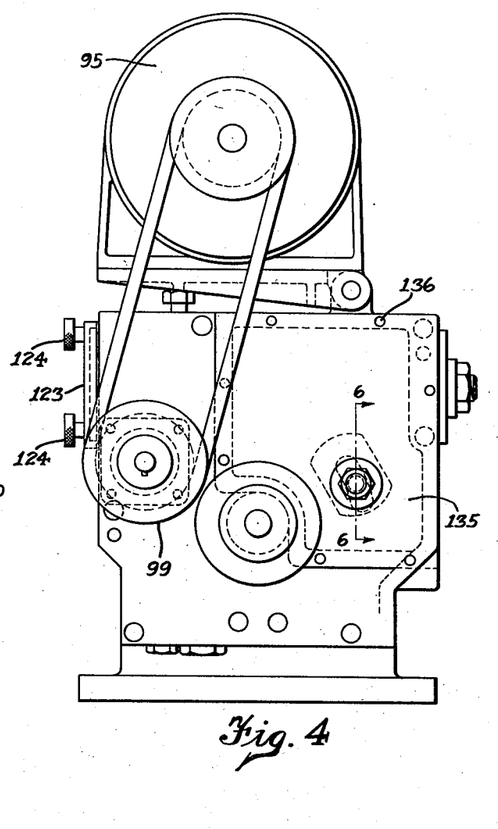
Fig. 4 is a rear end elevation of the work carrying base.
Figure 5:
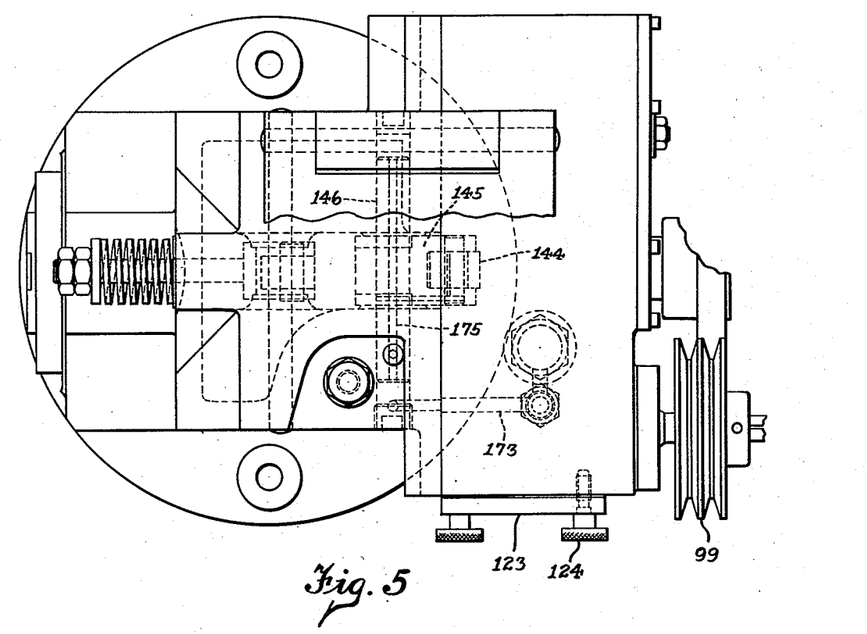
Fig. 5 is a top plan view of the work carrying base shown with the motor removed.

The work supporting base 14, on which the work 15 is carried, comprises a housing member 65 the lower end of which is pivotally mounted on a stud 66 provided in a slide 68 so that the housing 65 may be rotatably adjusted about a vertical axis and held on the slide 68 in any position of adjustment by means of suitable clamp bolts 70 having headed lower ends which operate in arcuate slots 69 of inverted T-shape provided in the slide 68. The slide 68 is adapted to slide rectilinearly on the base portion 12 in a direction transverse to the cutter axis, guideways 71 being arranged on the frame portion 12 for that purpose. A rotatable shaft 72, adapted to be operated by a suitable hand crank or the like, is carried by the frame portion 12 and is provided with threads 73 engaging the threads on a nut 74 which is rotatably supported by a bracket 75 projecting downwardly from the slide 68. It will thus be apparent that the gear axis may extend transversely to the cutter axis as shown in Figs. 1 and 2 so that the gear may be engaged by a pencil type cutter, there being provision for vertical adjustment of the cutter head in order that the proper position of the cutter axis with respect to the gear axis may be obtained. The work carrying base may be turned and arranged at a suitable angle to the cutter axis as shown at the left of Fig. 1 where the work is to be engaged by a hollow mill cutter, the reciprocatory movements of the slides on which the cutter head and the work supporting base are supported permitting the relationship of the cutter and the ends of the teeth engaged thereby to be controlled so that the teeth of gears of different pitch, diameter, etc. may be accommodated.

The gear which is to be cut by the pencil cutter 17 is carried by a work carrying member or arbor 80. The connection between the work and the work carrying arbor is preferably one which permits the work to be conveniently and rapidly secured so that different work pieces may be mounted without loss of time. As shown, the end of the arbor 80 which projects from the housing 65 detachably carries an attachment plate 82 having a cylindrical boss portion 83 on which the gear may be mounted and located by a suitable locating finger 81 of any suitable character. Projecting through the gear is a rod 84 which extends through a passage in the work carrying arbor and which is fixed to a piston 85 at its opposite end. This piston operates in a cylinder 86 which is connected at its opposite ends to a fluid pressure supply under the control of the operator so that the rod 84 may be held by fluid pressure in its retracted position in which it secures a holding plate 87 against the side of the gear, thus forcing the other side of the gear against the attachment plate 82. The holding plate 87 is preferably a slotted C plate which may be readily applied between the gear and the nut 88 on the end of the rod, the plate 87 being adapted to be removed vertically from the rod 84.

The work carrying arbor 80 is rotatably mounted, preferably by antifriction bearings 90 and 91, in an arbor support 92, the antifriction bearings holding these two parts against relative axial movement. The rearwardly projecting portion of the arbor 80 rotates in an opening 93 provided in the housing which holds suitable packing material 94 preventing the loss of lubricant which is contained in the lubricant chamber 95.

Figure 10:
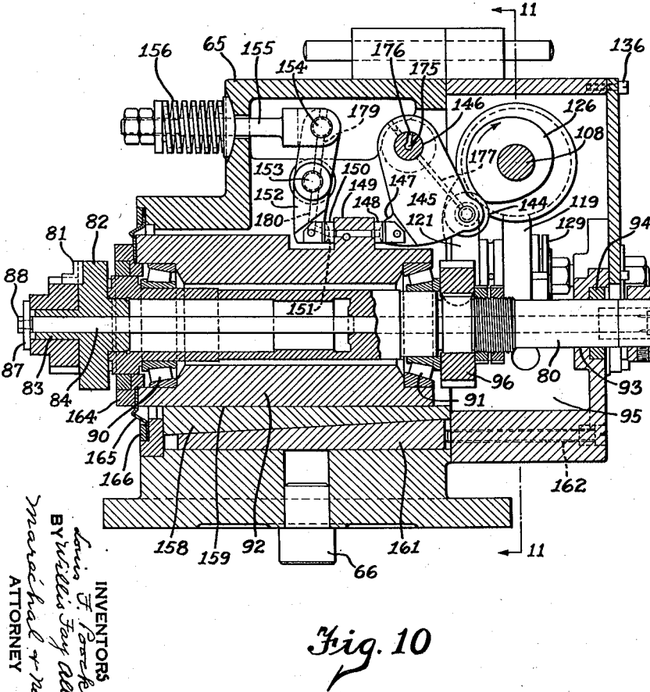
Fig. 10 is a central vertical section on the line 10—10 of Fig. 1.
Figure 11:
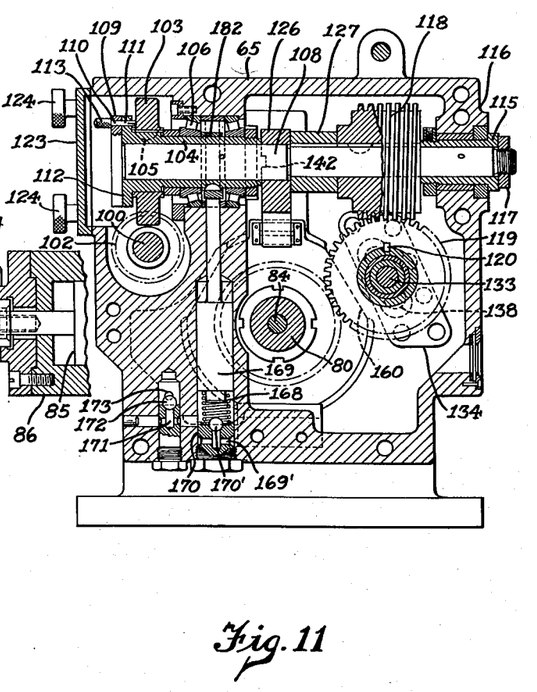
Fig. 11 is a section on the line 11—11 of Fig. 10.

Rotational movements are imparted to the arbor 80 from an electric motor 95 preferably carried at the top of the housing, and connected through mechanism illustrated in Figs. 3, 4, 10, and 11 to a spur gear 96 which is keyed to the arbor 80. The motor is provided with a pulley wheel 97 connected by belt 98 to pulley wheel 99 fixed to a shaft 100 which is suitably journalled by antifriction bearings 101 arranged in the walls of the housing 65. Shaft 100 carries a worm 102 which drives a worm wheel 103 fixed to a sleeve 104 by means of a suitable key 105. The sleeve 104 is rotatably supported by means of antifriction bearings 106 in the housing 65 and preferably extends transversely above the work carrying arbor 80 as shown in Fig. 11. Fitting within the sleeve 104 is a shaft 108, the end of the shaft having a plate portion 109 integral therewith, this plate portion having an annular series of holes 110 differing slightly in number from an annular series of holes 111 provided in the flange 112 at the end of the sleeve 104. A connection pin 113 may be inserted in any of the holes 110 and engaged with any of the holes 111 so that the shaft 108 is rotatably adjustable in the sleeve 104 and the two parts may be secured together in any desired position of adjustment.

Figure 6:
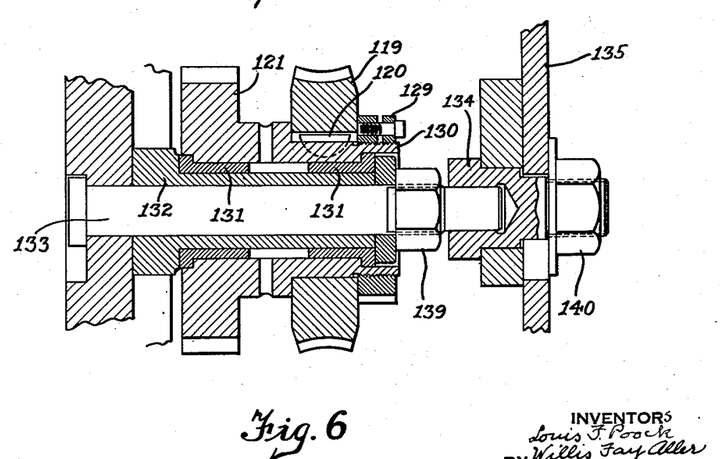
Fig. 6 is a section on the line 6—6 of Fig. 4.

The shaft 108 projects through the sleeve 104 and its projecting end is carried in a bearing member 115 which is rotatable in the side wall 116 of the housing 65. The end of the shaft 108 projects beyond the bearing member 115 and is engaged by a nut 117 which is effective in holding the inner end of the bearing member 115 securely against an operating member 118, keyed to the shaft 108 and shown in Fig. 11 in the form of a worm engageable with a worm wheel 119 which is secured by means of a key 120 to a spur gear 121 (see Fig. 6). The spur gear 121 is in meshing engagement with the gear 96 on the work carrying arbor 80. The work carrying arbor is thus rotated slowly at a constant speed in timed relation with the movements of the shaft 108.

The shaft 108 is adapted to be readily withdrawn in an endwise direction after removing the holding nut 117 and after removing the cover wall 123 which is held in place by two thumb screws 124 threaded in the main housing portion 65. The pin 113 is withdrawn, and the shaft 108 can then be pulled out towards the left from its position shown in Fig. 11, the worm wheel 118 dropping free from the shaft. Between the worm wheel 118 and the sleeve 104 is a cam 126 and a spacing ring 127 provided between it and the worm 118, the cam and the spacing ring also dropping free from the shaft 108 as the latter is pulled out of the housing. The purpose of the cam 126 will be presently described. As the worm wheel 118 is quite conveniently removable from the shaft 108, it may be replaced by other worms or the like arranged to provide the desired rate of speed of rotation of the work carrying arbor. As the worms 118 may vary in diameter the worm wheel 119 with which they engage is readily removable from the gear 121, being held thereon by a split retaining nut 129 which is threaded on the end of the boss 130 on which the worm wheel 119 is keyed. The boss 130 is rotatably mounted on bearing members 131 carried by a sleeve 132 which is supported on shaft 133, the latter being mounted at one end in a side of the housing 65, and being supported in a removable centering member 134 carried by the removable end plate 135. The latter may be removed by loosening the holding screws 136 which hold it to the main part of the housing. Proper meshing engagement is obtained between the gears 121 and 96, as the axis of the shaft 133 is bodily adjustable with respect to the center of the gear 96, the end of the shaft and the centering member 134 being movable in slots 138 formed in the housing wall and in the cover plate 135 these slots having a curvature concentric with respect to the axis of the work supporting arbor. This permits the use of different size worm and worm wheels. The proper selected position of the axis of the shaft 133 is maintained by tightening the securing nuts 139 and 140.

In the construction illustrated in Figs. 10 and 11 the work carrying arbor is adapted to rotate at a constant speed and the ends of the teeth on the work are engaged by the pencil cutter to give a proper curved formation to the tooth ends by moving the work in an axial direction at a controlled rate and in time with the rotational movements of the work. This axial movement of the work is effected by moving the arbor support 92 axially, the arbor 80 moving with it, such movement being produced by the cam 126 which was previously mentioned. The cam 126 is supported for rotatable adjustment on the shaft 108 but is interlocked with the end of the sleeve 104 which has a projection 142 engaging a recess in the side of the cam 126. The cam 126 thus rotates with the shaft since the sleeve 104 is locked to the shaft, but the relative positioning of the cam with respect to the worm 118 may be varied by changing the positioning of the pin 113 in the various vernier holes in the flange 112 and plate portion 109.

The cam 126 engages a roller 144 which is rotatably carried on the end of a pivoted arm 145, mounted for oscillatory movement on a shaft 146 and provided centrally above the arbor support. The arm 145 has a rounded nose 147 which engages and operates in a cylindrically curved socket in a small slide block 148 which may move up and down and which abuts against a post 149 provided at the top of the arbor support as shown in Fig. 10. At the other side of the post 149 is a second vertically slidable block 150 having a curved socket fitting the rounded nose 151 on a lever 152 which is pivotally supported on a shaft 153. The upper end of the lever 152 is pivotally connected at 154 to a rod 155 urged towards the left as viewed in Fig. 10 by means of a spring 156. The spring 156 thus acts against the cam, and the spring and cam control the axial shifting of the arbor support 92, the spring serving to effectively maintain the slide blocks 148 and 150 in sliding engagement with the flat lateral sides of the post 149. The cam 126 is so shaped as to move the work axially at a controlled rate so that as the work turns the desired relative movement between the work and the tool will be produced to give the proper formation on the teeth of the work. As will be apparent the post 149, which receives the thrust from the spring and cam, is vertically above the work carrying arbor 80, and the members on the shaft 108 which control the rotational and endwise movements of the work are arranged closely adjacent and with only a comparatively few operating parts between them and the work carrying member so that lost motion is substantially eliminated.

The arbor support 92 is slidably mounted on a slide block 158 having a horizontal upper slide surface 159 engaging the lower side of the arbor support 92. Additional slide surfaces 160 extending parallel to the arbor axis, see Fig. 11, mount the arbor support 92 for rectilinear movement. The slide block 158 is vertically adjustable so as to prevent lost motion or play by means of a wedge member 161 the position of which is controlled by a threaded adjustment rod 162 which may be turned by the operator to properly position the parts so that wear may be taken up.

At the front end of the arbor support the latter is provided with a ring 164 bolted in place and clamping against the inner portions of a flexible annular disk 165 of leather or other suitable material. The outer edge of the disk 165 is held between a clamp ring 166 and the adjacent portions of the housing, thus sealing the bearings against the entrance of chips and against the loss of lubricant.

To supply lubricant to the various operating parts of the machine, an oil pump 168 is provided in the housing and so arranged as to be operated every time an indexing operation takes place. The pump comprises a pump piston 169 movable in the cylindrical wall 170 of the housing forming the pump cylinder. As the pump piston 169 reciprocates, oil flows in from the oil sump 95 through the inlet passage 169' and past the ball check 170', this inflow taking place so as to fill the pump chamber as the piston 169 moves upwardly. As the piston descends the ball check 170' closes and the oil is forced through a passage 171 past a ball check 172 and into a supply line 173 which extends through the walls of the housing for the supply of lubricant to the various operating parts. An oil passage 175, supplied with oil from the passage 173 extends from the housing through the shaft 146 which supports the oscillatory arm 145, branch passages 176 extending out to the relatively moving surfaces of this mechanism. The branch passage 177 extends down to and through the arm 145 from the shaft 146 and lubricates the supporting shaft on which the roller 144 is provided. Oil is also supplied through the bearing which supports the lever 152, branch passages 179 and 180, see Fig. 10, supplying the oil to the moving parts including the slide blocks 148 where they engage with the rounded noses 147 and 151 of the arm 145. The pump piston 169 is operated by an eccentric strap 182 provided on an eccentric surface on the outer side of the sleeve 104 and preferably between the bearings 108. As the sleeve 104 turns, the pump plunger will be reciprocated so that one complete reciprocatory cycle of the pump takes place for each cycle of advancing and returning movements of the work.

Figure 12:
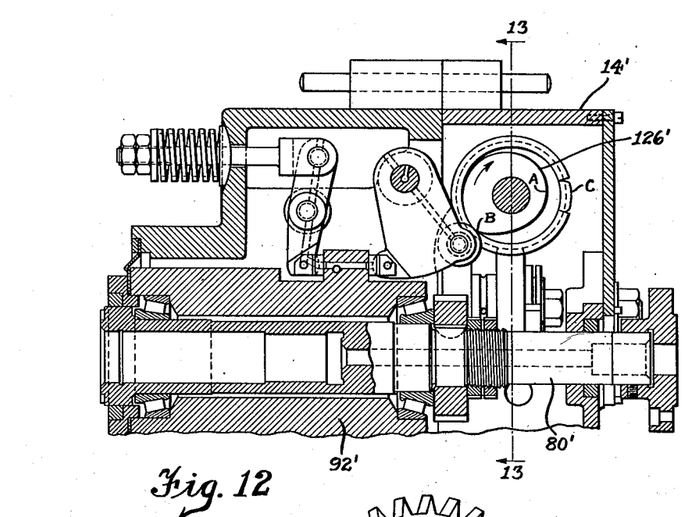
Fig. 12 is a section on the line 12—12 of Fig. 1.
Figures 13, 15:
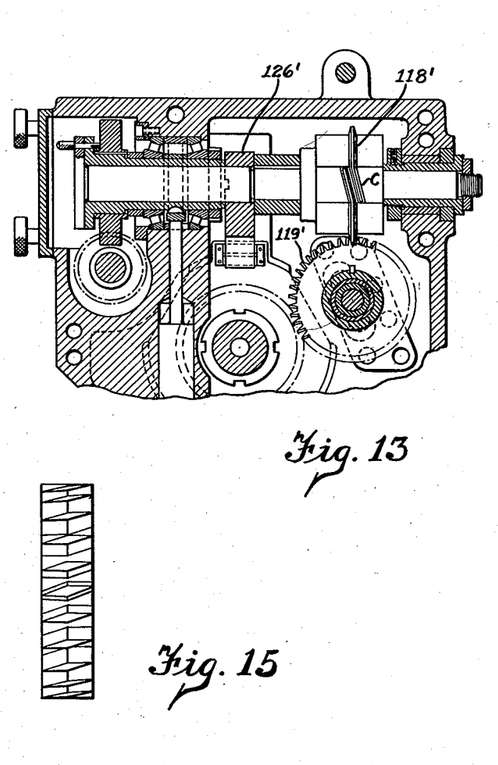
Fig. 13 is a section on the line 13—13 of Fig. 12.
Figs. 14 and 15 are detail views of the worm wheel employed with the work supporting head when a hollow mill cutter is used.
Figure 14:
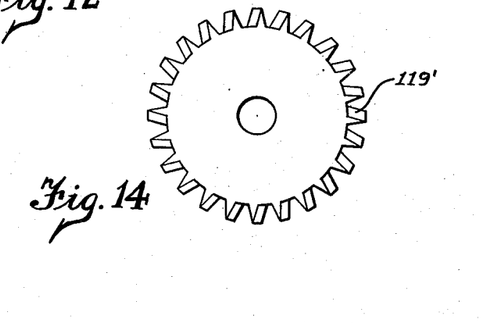

In the form of construction shown in Figs. 10 and 11, the machine is shown as adapted for use with a pencil cutter, the rotational movements of the gear taking place continuously and at a substantially uniform speed, while the endwise movement of the gear is so controlled, by reason of the shape of the cam 126, as to properly form the tooth ends by the cutter, which merely rotates about its own axis without moving endwise during the cutting operation. The cutter is advanced initially into cutting position by control of the fluid pressure supply to the cylinder, and after all the teeth of the gear have been cut, the cutter head is retracted by moving the slide 25 toward the right from its position shown in Fig. 8 to permit the gear 15 to be readily removed. The same work supporting head may be readily adapted, however, for cooperation with a hollow mill cutter such as is shown in Fig. 1 at 17', by replacing the worm 118 and the worm wheel 119 with members adapted to hold the work carrying arbor stationary throughout the greater part of a cycle of operations and then quickly turn the work carrying arbor for an indexing operation. The cam 126 is also replaced by one having the proper formation to advance the work into the rotating hollow mill cutter during the time the work carrying arbor is held against rotation. Figs. 12 to 15 show the work supporting base 14' adapted for use with a hollow mill cutter 17'. The parts illustrated in Figs. 12 and 13 are exactly the same in construction as those illustrated in Figs. 10 and 11 except that where the machine is adapted for use with the hollow mill cutter the cam 126' between the points A and B is arranged to advance the arbor support 92' continuously, the returning movement of the arbor support taking place in about one-third of a revolution under the control of the portion of the cam between B and A. During the advancing movements of the arbor support 92', the work carrying arbor 80' is held stationary by means of an intermittent worm or drum cam 118' which replaces the worm 118. Throughout about 270° of rotation, the single tooth track on the cam 118' extends annularly and engages between two adjacent teeth of a worm wheel 119', thus holding the latter stationary. However throughout about 90° extent of the cam member 118 the track ends are inclined as shown at C in Figs. 12 and 13, this portion of the cam surface producing one step of turning movement of the worm wheel and thus advancing the work a predetermined amount which may be equal to one tooth on the work. The work is thus indexed after being moved back out of engagement with the cutter to bring successive teeth on the work into engagement with the cutter in a step-by-step manner, and the axial movements of the work take place while the latter is held against rotation so that the ends of the teeth of the work 15' may be properly engaged by the interior cutting edges on the hollow mill cutter.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a machine of the character described for shaping the ends of gear teeth, a support, a work carrying member mounted for rotatable and reciprocatory movement in said support and adapted to carry a toothed work piece to be worked on, a driven gear on said member and rotatable therewith, a driven shaft rotatable in said support above said member, gear means operated by said shaft and operably connected to said driven gear, cam means on said shaft above said member for axially moving said member in timed relation to its rotational movements, and means for operating said driven shaft.

2. In a machine of the character described for shaping the ends of gear teeth, a supporting base, a work carrying member mounted for rotatable and reciprocatory movement in said base and adapted to carry a toothed work piece to be worked on, a driven gear on said member and rotatable therewith, a driven shaft rotatable in said base adjacent said member, gear means operated by said shaft and operably connected to said driven gear, means on said shaft for axially moving said member in timed relation to its rotational movements, a reciprocable pump for supplying oil to moving parts of the machine, and means operated by said shaft for driving said pump.

3. In a machine of the character described for shaping the ends of gear teeth, a frame, a work supporting base, means on said frame mounting said base for rectilinear sliding movement and for rotational adjustment, a cutter head, means on said frame mounting said head for rectilinear sliding movement, adjustable threaded members for bodily raising and lowering the said head, a work carrying member mounted for rotatable and reciprocatory movement in said work supporting base and adapted to carry a toothed work piece to be worked on and means for rotating said member and for axially moving said member in timed relation to its rotational movements.

4. In a machine of the character described for shaping the ends of gear teeth, a frame, a work supporting base, means on said frame mounting said base for rectilinear sliding movement and for rotational adjustment, a cutter head, means on said frame mounting said head for rectilinear sliding movement, adjustable threaded members for bodily raising and lowering the said head, a work carrying member mounted for rotatable and reciprocatory movement in said work supporting base and adapted to carry a toothed work piece to be worked on, a driven gear on said member and rotatable therewith, a driven shaft rotatable in said base adjacent said member, means operated by said shaft for rotating said driven gear, means for axially moving said member in timed relation to its rotational movements, and means for rotating said driven shaft.

5. In a machine of the character described for shaping the ends of gear teeth, a frame, a work supporting base on said frame, a work carrying member mounted for rotatable and reciprocatory movement in said base and adapted at one end thereof to carry a toothed work piece to be operated on, a driven gear on said member and rotatable therewith and spaced from the work piece carrying end of said member, a driven shaft rotatable in said base and arranged transversely of the axis of said work carrying member, gear means operated by said shaft and operably connected to said driven gear, cam means on said shaft and vertically disposed with respect to said member, means operated by said cam means for axially moving said member in timed relation to its rotational movement, and means for rotating said driven shaft.

6. In a machine of the character described for shaping the ends of gear teeth, a frame, a work supporting base on said frame, a work carrying member mounted for rotatable and reciprocatory movement in said base and adapted to carry a toothed work piece to be operated on, a driven gear on said member and rotatable therewith, a driven shaft rotatable in said base and arranged transversely of the axis of said work carrying member and above the same, gear means operated by said shaft and operably connected to said driven gear, cam means on said shaft arranged vertically above said member, means operated by said cam means for axially moving said member in timed relation to its rotational movement, and means for rotating said driven shaft.

7. In a machine of the character described for shaping the ends of gear teeth, a frame, a work supporting base on said frame, a work carrying member mounted for rotatable and reciprocatory movement in said base and adapted at one end thereof to carry a toothed work piece to be operated on, a driven gear on said member and rotatable therewith and spaced from the work piece carrying end of said member, a driven shaft rotatable in said base and arranged transversely of the axis of said work carrying member, gear means operated by said shaft and operably connected to said driven gear, cam means on said shaft and vertically disposed with respect to said member, means operated by said cam means for axially moving said member in timed relation to its rotational movement, means for rotating said driven shaft, a cutter head on said frame, a cutter mounted in said head for rotation about its own axis and adapted to shape the tooth ends on the work piece on said work carrying member.

8. In a machine of the character described for shaping the ends of gear teeth, a supporting base, a work carrying arbor, an arbor support rotatably supporting said arbor and axially movable therewith, means on said base slidably mounting said arbor support for axial movement, means on said arbor for supporting a toothed work piece to be operated on, a driven gear fixed on said arbor, a driven shaft rotatably mounted in said base adjacent said arbor support and adapted for endwise removal, means removably carried by said shaft for continuously determining the position of the driven gear on its axis to periodically rotate said driven gear and to periodically hold the driven gear against rotation, means removably carried by said shaft for axially moving said arbor support in timed relation to the rotational movements of the arbor, and means for operating said driven shaft.

9. In a machine of the character described for shaping the ends of gear teeth, a supporting base, a work carrying arbor, an arbor support rotatably supporting said arbor and axially movable therewith, means on said base slidably mounting said arbor support for axial movement, means on said arbor for supporting a toothed work piece to be operated on, a driven gear fixed on said arbor, a sleeve rotatably mounted in said base, a bearing member in said base, a driven shaft supported in said sleeve and bearing member and adapted for endwise removal therefrom, a pair of operating means removably carried by said shaft between said bearing member and sleeve one for operating said driven gear and the other for axially moving said arbor support in timed relation to the rotational movements of the arbor, one of said operating means having a driving connection with the shaft and the other having a driving connection with the sleeve, a drive gear on said sleeve, means for operating said drive gear, and means for adjustably fixing said shaft to said sleeve to provide for relative rotational adjustment of said operating means.

10. In a machine of the character described for shaping the ends of gear teeth, a supporting base, a work carrying arbor, an arbor support rotatably supporting said arbor and axially movable therewith, means on said base slidably mounting said arbor support for axial movement, means on said arbor for supporting a toothed work piece to be operated on, a driven gear fixed on said arbor, a driven shaft rotatably mounted in said base adjacent said arbor support and adapted for endwise removal, a worm wheel, a gear fixed to said worm wheel and meshing with said driven gear, means supporting said worm wheel and gear for adjustment about the axis of said driven gear, means removably carried by said driven shaft for operating said worm wheel, means removably carried by said shaft for axially moving said arbor support in timed relation to the rotational movements of the arbor, and means for operating said driven shaft.

11. A machine of the character described for shaping the ends of gear teeth comprising a frame, a work supporting base on said frame, a work carrying arbor, an arbor support rotatably supporting said arbor and axially movable therewith, means in said base for supporting said arbor support for axial movement, drive means in said base, means operated by said drive means for reciprocating said arbor support, a rotatable means operated by said drive means for holding said arbor against rotation during the major portion of a rotation of said member and for turning the arbor for an indexing operation in timed relation with its endwise movement and while the work on the arbor is retracted from a cutter, a cutter head on said frame, and a cutter rotatably mounted in said head and adapted to shape the tooth ends of the work on said work carrying arbor.

12. A machine of the character described for shaping the ends of gear teeth comprising a frame, a work supporting base on said frame, a work carrying member mounted for rotatable and reciprocatory movement in said base, rotatable drive means in said base, rotatable cam means operated by said drive means for reciprocating said member, a rotatable means operated by said drive means for holding said member against rotation during the major portion of a rotation of said means and for periodically turning said member for an indexing operation in timed relation with its endwise movement while the work on said member is retracted from a cutter, a cutter head on said frame, and a cutter rotatably mounted in said head and adapted to shape the tooth ends of the work on said work carrying member.

13. A machine of the character described for shaping the ends of gear teeth comprising a frame, a work supporting base on said frame, a work carrying member mounted for rotatable and reciprocatory movement in said base, rotatable drive means in said base, a rotatable cam operated by said drive means for reciprocating said member, rotatable intermeshing toothed parts operated by said drive means and operable in timed relation with said cam for holding said member against rotation during a cutting operation and for turning said member for an indexing operation in timed relation with its endwise movement while the work on said member is retracted from a cutter, a cutter head on said frame, and a cutter rotatably mounted in said head and adapted to shape the tooth ends of the work on said work carrying member.

14. A machine of the character described for shaping the ends of gear teeth comprising a frame, a work supporting base on said frame, a work carrying member mounted for rotatable and reciprocatory movement in said base, a rotatable cam for reciprocating said member, means rotatable with said cam for holding said member against rotation during a cutting operation and for turning said member for an indexing operation in timed relation with its endwise movement while the work on said member is retracted from a cutter, a common shaft removably carried in said base and removably supporting said cam and the said means rotatable therewith, a cutter head on said frame, and a cutter rotatably mounted in said head and adapted to shape the tooth ends of the work on said work carrying member.

15. A machine of the character described for shaping the ends of gear teeth comprising a frame, a work supporting base on said frame, a work carrying member mounted for rotatable and reciprocatory movement in said base and adapted at one end thereof to carry a toothed work piece to be operated upon, a rotatable drive shaft in said base, means operated by said drive shaft to rotate the work carrying member a predetermined part of a revolution and then hold the same against rotation, means operated by said drive shaft to move the work carrying member endwise when the work carrying member is held against rotation, a cutter head on said frame, and a cutter rotatably mounted in said head and adapted to shape the tooth ends of the work piece, both of said drive shaft operated means being mounted for ready removal and replacement in said base for variation of the character of the rotational and reciprocatory movement imparted thereby to said work carrying member.

16. A machine of the character described for shaping the ends of gear teeth comprising a frame, a work supporting base on said frame, a work carrying member mounted for rotatable and reciprocatory movement in said base and adapted at one end thereof to carry a toothed work piece to be operated upon, a driving gear on said work carrying member, a rotatable drive shaft in said base, a toothed member on said shaft, transmission means operated by said toothed member and interposed between the same and said drive gear and adapted for ready removal and replacement in said base for controlling the rotational movements of the work carrying member and for periodically holding the work carrying member against rotation, a rotatable cam on said shaft and coaxial with said toothed member for moving the work carrying member endwise, a cutter head on said frame, and a cutter rotatably mounted in said head and adapted to shape the tooth ends of the work piece.

17. A machine of the character described for shaping the ends of gear teeth comprising a frame, a work supporting base on said frame, a work carrying member adapted to support the work coaxially therewith and mounted for rotational and axial movement in said base, indexing means for rotating said work carrying member step by step, operating means for moving said work carrying member axially in timed relation to its indexing movement between successive indexing steps, a common drive member for said indexing and operating means, a cutter head on said frame, a cutter rotatably mounted in said head on an axis substantially in a plane containing the work axis and adapted to shape the tooth ends of the work on said work carrying member, drive means providing for continuous rotation of the cutter and means for adjustably setting the axis of rotation of said cutter with respect to the axis of the work.

18. A machine of the character described for shaping the ends of gear teeth comprising a frame, a work supporting base adjustably carried by said frame, a work supporting member adapted to support the work coaxially therewith and mounted for rotational and axial movement in said base, indexing means in said base for rotating said work carrying member step by step, operating means in said base for moving said work carrying member axially in said base in timed relation to its indexing movement between successive indexing steps, a common drive member in said base for said indexing and operating means, a cutter head on said frame, a cutter rotatably mounted in said head on an axis substantially in a plane containing the work axis and adapted to shape the tooth ends of the work on said work carrying member, drive means providing for continuous rotation of the cutter, and means for adjustably setting the axis of rotation of said cutter with respect to the axis of the work.

LOUIS F. POOCK.
WILLIS FAY ALLER